No. 784,956. PATENTED MAR. 14, 1905.
J. MORAT.
FURNACE FOR TREATING METAL.
APPLICATION FILED OCT. 4, 1904.
3 SHEETS—SHEET 1.
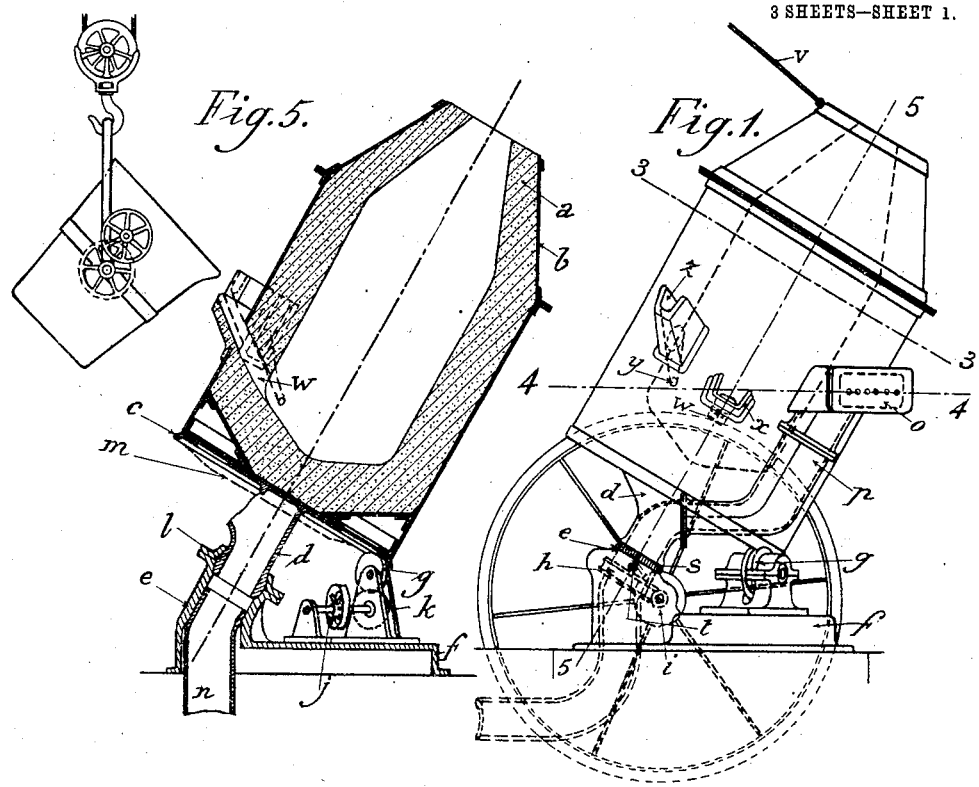
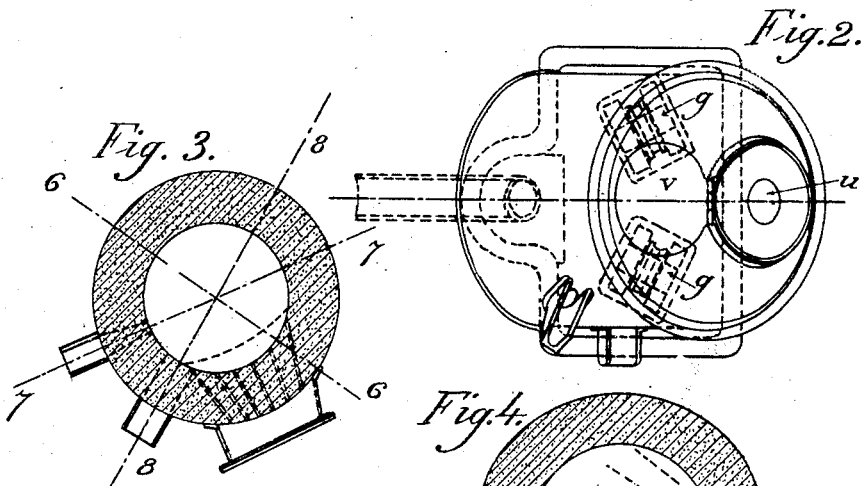
Witnesses.
S. W. Wright
Walter Abbe
Inventor
Jacques Morat
by Howson and Howson
Attorneys No. 784,956. PATENTED MAR. 14, 1905.
J. MORAT.
FURNACE FOR TREATING METAL.
APPLICATION FILED OCT. 4, 1904.

3 SHEETS—SHEET 3.

Witnesses
P. W. Wright
Walter Abbe

Jacques Morat
Inventor,
by Howson and Howson
Attorneys

No. 784,956. Patented March 14, 1905

UNITED STATES PATENT OFFICE.

JACQUES MORAT, OF NEW YORK, N. Y.

FURNACE FOR TREATING METAL.

SPECIFICATION forming part of Letters Patent No. 784,956, dated March 14, 1905.

Application filed October 4, 1904. Serial No. 227,154.

*To all whom it may concern:*

Be it known that I, JACQUES MORAT, a citizen of the Republic of France, residing in the borough of Manhattan, in the city, county, and State of New York, have invented certain new and useful Improvements in Furnaces for Treating Metal, of which the following is a specification.

Heretofore melting-furnaces for metals and converters for the production of steel have consisted of a vessel to contain the material to be treated, which is mounted on trunnions, so that the entire vessel may be tilted to pour the contents out of what is normally the upper portion of the vessel, and in the converters this angular displacement of the vessel is also made use of for changing the angle on which the blast from the twyers strikes the surface of the metal.

The main object of this invention is to do away with the cumbersome and laborious tilting of the vessel to enable a minimum of power to not only accomplish the pouring of the molten metal, but to enable said power to be applied in a more readily controllable manner to make more sure the determination of what the pour shall be. I accomplish this object by centrally mounting the vessel so as to be revoluble on a support, the axial line of the vessel being inclined to the vertical, and I provide means for rotating said vessel on the angular axis thus produced to bring certain charging or discharging openings in the side of the vessel either below the level of the molten metal or above it. In the case of a converter the air-twyers are likewise located in the side of the vessel.

Figure 6:
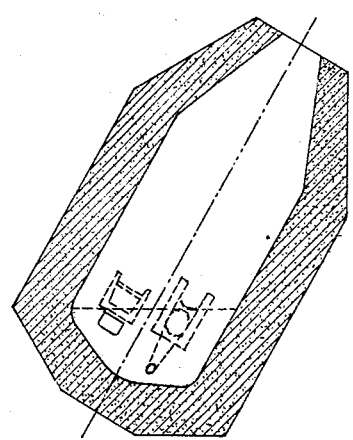
Figure 7:
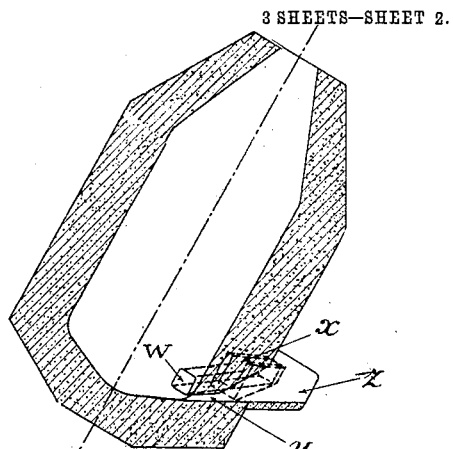
Figure 8:
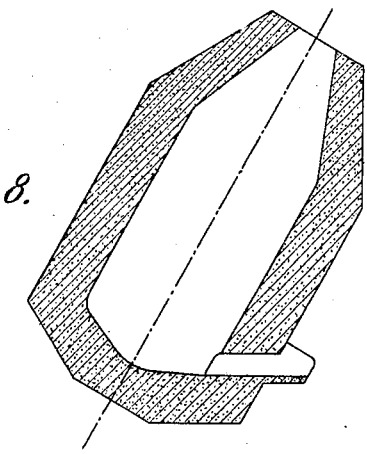
Figure 9:
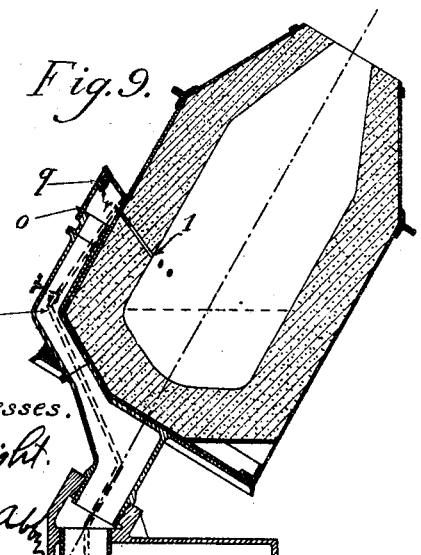
Figure 10:
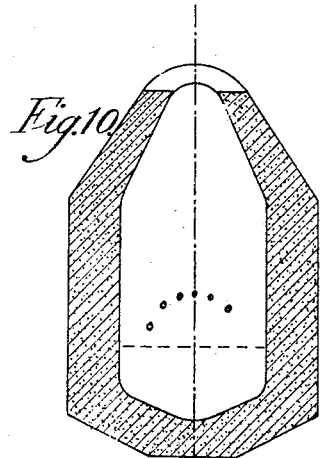
Figure 12:
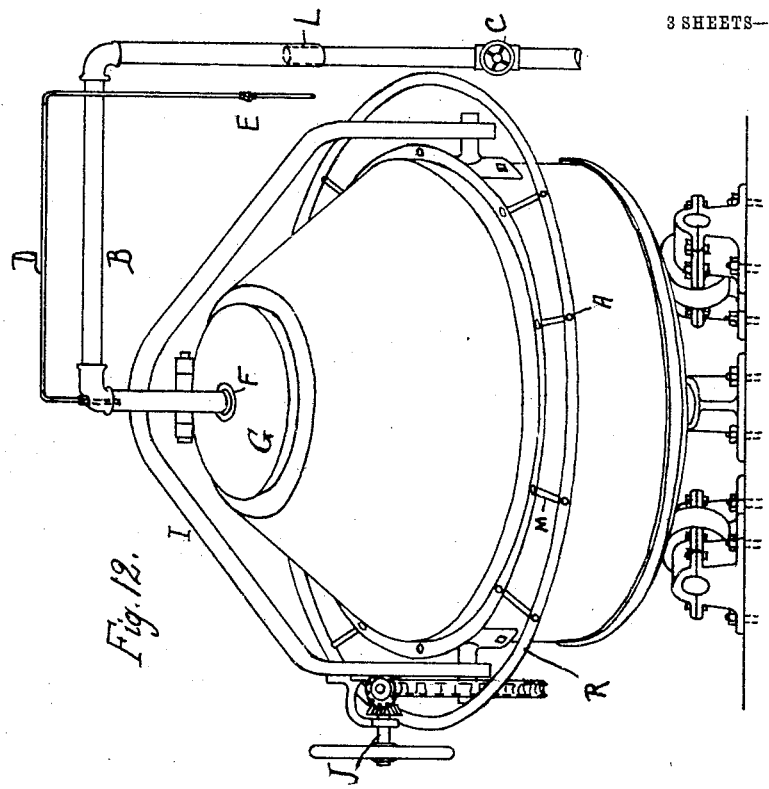
Figure 11:
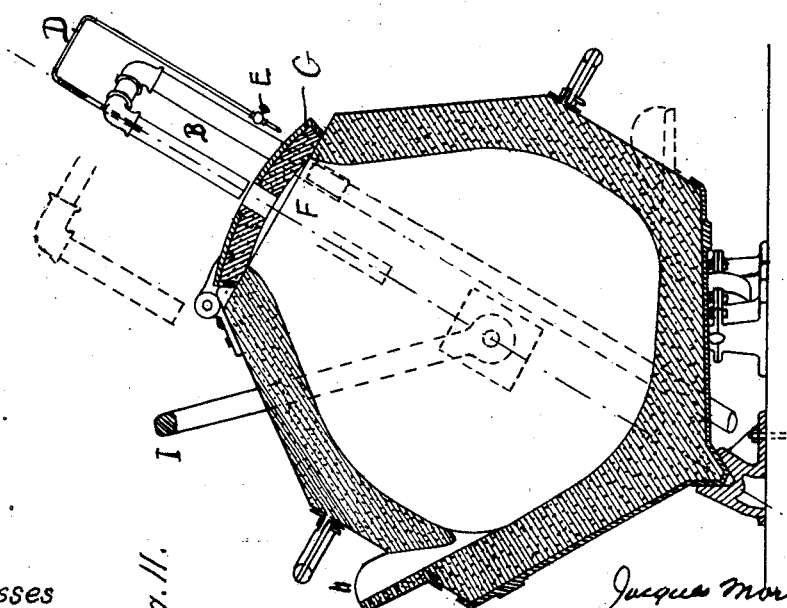

In the accompanying drawings, Figure 1 is a side elevation. Fig. 2 is a plan. Fig. 3 is a cross-section perpendicular to axis 5 5 on the line 3 3 of Fig. 1. Fig. 4 is a horizontal section, and therefore at other than a right angle to the axis of the inclined converter on the line 4 4 of Fig. 1. Fig. 5 is a longitudinal section on the line 5 5 of Fig. 1, but showing a modification in the construction of the trunnion or bearing upon which the converter turns and also a modification in the application of power to effect its rotation. Fig. 6 is a longitudinal section, omitting the twyers, on the line 6 6, Fig. 3, with the converter in a position about ninety degrees from that shown in Fig. 5. Fig. 7 is a section on the line 7 7, Fig. 3, with the converter in the position of something less than one hundred and eighty degrees from that shown in Fig. 5. Fig. 8 is a similar section on the line 8 8, Fig. 3, but with the converter in a position of one hundred and eighty degrees from that shown in Fig. 5. Fig. 9 is a longitudinal section similar to Fig. 5, but with the converter in such position that the twyers are in the upper side thereof and cut by the section. Fig. 10 is a longitudinal section made for the purpose of showing the arrangement of twyers, and therefore for great clearness the converter is shown ninety degrees from its position indicated in Fig. 9. Fig. 11 is a vertical sectional view of a melting-furnace constructed according to my invention, and Fig. 12 is an elevation of the same.

The converter, preferably tapered at both ends, is shown as composed of the usual lining *a* and shell *b*, Figs. 1 and 5. Around the base or lower edge of the shell is attached an annular rail *c*, and centrally secured to the base of the converter-shell in any appropriate way is a hollow trunnion *d*, having a bearing in the hollow angularly-disposed upwardly-extending part *e* of the base plate or frame *f*. The converter is supported by two or more pulleys *g*, mounted in the brackets extending up from the base-plate and in the grooved faces of which the annular rail *c* travels. The converter may be rotated about its longitudinal axis by power applied in any appropriate way. For instance, in Fig. 1 a worm-wheel *h* is applied to the hollow trunnion *d* and is engaged by a worm *i*, that may be operated by means of a suitable hand-wheel or otherwise.

In Fig. 5 the converter-supporting pulley *g* may be power-driven by means of a belt or gear applied to a pulley or gear *j* on the shaft of a gear *k*, meshing with teeth formed, as shown in Fig. 5, in the flanges of the grooved pulley *g*.

The manner by which rotation of the converter is effected is not material and any appropriate means may be adopted. In some cases it may be desirable while rotating the converter about its longitudinal axis to impart a rocking motion to it, and this may be accomplished, as indicated in Fig. 5, by making the pulley *g* and gear *h* eccentric, and in this case the bearing of the trunnion in the frame or casting may be spherical, as shown at *l*, Fig. 5, or the same result may be obtained by making the pulley concentric and providing the rail *c* with a cam-face, as shown by dotted line at *m* in Fig. 5. A compressed-air-supply pipe *n* communicates with the hollow trunnion *d*, and air is led to the air-box *o* of the twyers by a pipe *p*, branching from the hollow trunnion, as indicated in Figs. 1 and 9.

Fig. 1 and Fig. 9 show one row or series of twyers. This invention is not limited to any particular number of twyers or of rows of twyers nor to any special way in which they may be arranged. It may be said, however, that it is preferred that the twyers should be in the same plane in one row divergent and symmetrical, as shown in Fig. 4, in order that the surface of the bath may be well covered, as indicated by dotted lines emanating from the inner orifice of the twyers and at the same time have a small wind-box casting. I also prefer to have a disposition of twyers such that they will deliver the blast upon the surface of the metal to as great an area as possible without waste of air; but this is immaterial, as the now several common ways of applying the blast to the molten metal can serve the purpose.

A scale *s* may be forced on or attached to the hollow trunnion, as indicated in Fig. 1, and read in connection with a pointer *t* to indicate to the operator the position of the twyers with reference to the surface of the bath, as well as the position of certain openings in the wall of the converter hereinafter described.

The top of the converter is formed with an opening *u* for escape of gases during the operation and may be closed when desired by a hinged door *v*.

In the wall of the converter are one or more openings for charging molten metal into the converter and for withdrawing it therefrom when the operation is completed. In the present instance two such are shown—one, *w*, to the outer orifice of which is applied a pouring lip or frame *x*, and a smaller one, *y*, to the outer orifice of which is applied a pouring lip or frame *z*. Both openings preferably taper somewhat, being larger at their outer ends. As shown, the bottom edges of their inner ends both lie in substantially the same plane at right angles to the longitudinal axis of the converter; but this particular relation is not material. Both may be plugged when not in use by balls of clay.

With the converter in the position indicated in Fig. 5 molten metal may be run into the converter through, for instance, the opening *w* until the surface of the metal has reached the desired level. At this time, owing to the circumferentially relative disposition of the openings *w y* and twyers 1, the inner ends of the latter would be a substantial distance above the surface of the metal. The metal having been charged and opening *w* closed with a ball of clay, the converter is now rotated about its longitudinal axis into a position to bring the twyers into the desired angular relation and position with reference to the surface of the bath upon which the air-blast operates, compressed air having been admitted to the twyers at any appropriate or desired time by means of the manipulation of the usual valves. Owing to the converter being cylindrical and because its longitudinal axis about which it rotates is inclined, it is obvious that in order that all of the twyers shall occupy the desired position and angular relation to the surface of the bath that they cannot be disposed in one plane, taken at right angles to the longitudinal axis of the converter, but that they must be disposed as indicated in Fig. 9 and Fig. 10. During the operation of blowing, as in the manufacture of steel, suitable additions, as is well understood, may be made to the bath either in molten or solid form and may be introduced through the opening *u*. By the last-described rotation of the converter or by a reversed movement thereof, depending upon the position of the one or more openings *w y*, the opening *y*, for instance, will be brought to the position indicated in Fig. 5, in which, the operation being completed, the ball of clay closing opening *y* may be taken out and the metal may be run off by turning the converter farther. Fig. 6 shows the level of metal at the top of the oblique passage connecting spout or lip *z* with opening *y*. In that position the metal is almost high enough to run out of the spout *z*, and if the converter is turned farther the metal will run out, and when the converter has reached the position shown in Fig. 7 the hole *y* will be at its lowest position and all the metal will be able to run out, if desired, or the converter may be turned back toward the position shown in Fig. 6, so as not to run all of the metal out at the same time. In that manner and by turning the converter back and forth any quantity of metal can be drawn from the converter at one time without danger of admixture of slag and without disturbance or increase in the area of its surface. Finally, the slag may also be run off through the same opening, which may be of sufficient area, if desired, for the insertion of an appropriate tool to scrape out the slag. Owing, however, to the conservation of heat by non-disturbance of the blanket of slag upon the surface of the bath, keeping the opening *u* closed and confining the metal to a small space at the bottom of the converter, it is thought that in all cases the slag will be sufficiently fluid to readily flow through the opening. However, a second opening *w* of larger cross-section is shown, and this opening may be used particularly for withdrawing slag, if desired, and with ample area to permit insertion of a tool for removing the slag should it become necessary. The various positions of the converter for the several stages of the operation will be indicated with perfect accuracy by the scale and pointer $s\ t$, and with a little practice the operator can manipulate the converter with facility, rapidity, and certainty.

In charging, the level of metal in the converter may be ascertained by observation through the openings $w\ y$ 1 or any of them. The cam or eccentric pulley is for the purpose, if desired, of changing the angle of inclination of the converter during certain periods of the manufacture to vary the distance between surface of metal and the twyers. For example, it might be better to blow the metal with an inclination of ten degrees and keep that inclination during the blowing. Then just when the blowing is finished and before turning the blast off the converter is being turned around so as to clear the twyers above the slag the cam or eccentric can be used to increase the angle to, say, twenty-five degrees. It can be well understood that with an inclination of twenty-five degrees the twyers can be brought much farther from the metal than with an inclination of ten degrees, and thus prevent the slag from going into the twyers when the blast is stopped off.

Of course it is apparent that metal may be run off from any level below the blanket of slag and that the openings $w\ y$ may by rotation of the converter be so positioned that the slag may first be run off and finally the metal. Ordinarily, however, it would seem to be preferable not to remove all the slag first, as a thin blanket of slag lying upon the surface of the metal prevents dissipation of the heat of the bath and can be removed easily, if necessary, after all the metal is poured out.

Quite aside from the use of twyers in the side walls of the converter, the employment of a converter mounted and acting as that described and having one or more openings in its side walls for charging and discharging has marked advantage. For instance, as indicated in Fig. 5, the molten metal may be delivered from a ladle or pot at a point near the base of the converter, and the work frequently required to be done in elevating the vessel containing the molten metal to the top opening of the converter is avoided. Furthermore, the metal contents and slag floating upon its surface of the converter may be removed through the one or more openings $w\ y$ at any point at or below the surface level.

It is deemed to be unnecessary to recite in detail what are believed to be all the advantages incident to the construction disclosed. The principal ones have been pointed out. It may be further said, however, that the lining of the converter is better supported and subjected to less strain, and therefore not so liable to displacement and disintegration as in the usual form of converters which rock about a horizontal axis and from which the metal is delivered from the upper end by rocking the converter into a horizontal position, and also that such manipulation of an ordinary converter requires considerably greater expenditure of energy than the mere rotation of the converter as herein described. In pouring the metal from the converter there is no admixture of slag. The metal can keep hotter while in the converter than that obtained from ordinary converters, and consequently a greater variety of metals in very fluid state can be obtained and better castings can be made therefrom. The workmen are not subjected to discomfort and possible injury by exposure to high temperature.

A circular vessel is preferred for many reasons, although the invention is not so restricted, and the inside of the lining can be made parallel to the shell or can be reinforced where necessary—at the twyers, for instance, as shown by dotted line in Figs. 3 and 4.

As shown in Figs. 11 and 12, my invention is also applicable to melting-furnaces, in which case the furnace consists of an iron shell and of the usual lining and can be rotated as hereinbefore described, or, as shown in Figs. 11 and 12, a ring R can be secured to the shell by means of short pipes M. In a small furnace a man can pull directly on the ring R, while for the larger ones he can introduce an iron bar into openings A, Fig. 12, in the short iron pipes M. A spout H is provided, as shown in Fig. 11. This spout is above the bottom of the furnace while melting the charge, and when the contents of the furnace is to be poured the spout is at a lower or the lowest point of the furnace, as shown in dotted lines, Fig. 11.

In Figs. 11 and 12 I have shown the furnace fitted with a lid G, lined with fire-brick. A hole through that lid serves for passage of the burner composed of the usual air-pipe B, provided with a valve C to regulate the blast, and of an oil-pipe D, provided with a valve E. The gases from combustion can be made to escape through opening F in lid G, so as to serve as a regenerator for the oil and air entering the converter or can be discharged through spout H or through both. The furnace may be provided with a bail I, connected to the furnace by means of trunnions and gearing J, as shown in Figs. 11 and 12, so that the furnace may be lifted from its supports by a crane after melting and used for pouring the molds directly from the furnace. This could be done without admixture of slag in the same manner as in the converter. The different possible extreme positions of the ends of the burner-pipes are shown in Fig. 11 in dotted lines. The burner can be swung out of the way or sunk into the furnace by sliding one pipe into the other, for which purpose I provide a slip-joint at L, making the oil-pipe flexible, so as to follow the movement of the air-pipe.

I claim as my invention—

1. A vessel for treatment of molten metal having a restricted upper opening, and mounted with its longitudinal axis at an angle to a vertical line, and rotatable as an entirety at will about said axis and having in its side an aperture for the passage of metal.

2. A vessel for the treatment of molten metal, having a restricted upper opening and mounted with its longitudinal axis at an angle to a vertical line, and rotatable as an entirety at will about said axis and having in its side an aperture for charging and an aperture for discharging the metal.

3. A vessel or converter for the pneumatic treatment of molten metal, having a restricted upper opening and mounted with its longitudinal axis inclined to a vertical line, and having in its walls twyers for the air-blast and an opening for the discharge of the metal, combined with means for rotating the vessel as an entirety about its longitudinal axis at will, said twyers being so located in the wall of the vessel as to be above a normal charging-line during the charging operation.

4. A vessel or converter for the pneumatic treatment of molten metal, having a restricted upper opening and mounted with its longitudinal axis inclined to a vertical line and having in its walls twyers for the air-blast, and two side openings, combined with means for rotating the vessel as an entirety about its longitudinal axis at will, said twyers being so located in the wall of the vessel as to be above a normal charging-line during the charging operation.

5. A vessel or converter for the pneumatic treatment of molten metal, having a restricted upper end mounted with its longitudinal axis inclined to a vertical line and having in its walls twyers for the air-blast and an opening for the discharge of the metal combined with means for rotating the vessel as an entirety about its longitudinal axis at will for the purpose set forth, and an index indicating to the operator the angular position of the vessel and consequently the relation of the twyers to the surface of the metal therein.

6. A vessel or converter for the pneumatic treatment of molten metal, having a restricted upper end mounted with its longitudinal axis inclined to a vertical line and having in its walls twyers for the air-blast and an opening for discharging the metal, combined with means for rotating the vessel as an entirety about its longitudinal axis at will for the purpose set forth, and means for changing the angle of the longitudinal axis of the vessel.

7. A vessel for the treatment of molten metal, rotatably mounted with its longitudinal axis inclined to a vertical line, two openings $w$, $y$, in the wall thereof, one for the introduction of the metal and for withdrawal of the metal and slag, and in the position for pouring one being of a higher level than the other, and twyers arranged in the side wall of the vessel combined with means for rotating the vessel as an entirety at will about its longitudinal axis.

8. A vessel for the treatment of molten metal, having a restricted upper end rotatably mounted with its longitudinal axis inclined to a vertical line, two openings $w$, $y$, in the wall thereof, one for the withdrawal of the metal, and one for withdrawal of the slag, at different levels during the pour, and twyers arranged in the side wall of the vessel combined with means for rotating the vessel as an entirety at will about its longitudinal axis, and an index by which is indicated to the operator the disposition of the twyers with reference to the surface of the contained metal-bath.

9. A vessel for the treatment of molten metal, rotatably mounted with its longitudinal axis inclined to a vertical line, two openings $w$, $y$, in the wall thereof for introduction of the metal and for withdrawal of the metal and slag, and twyers arranged in the side wall of the vessel combined with means for rotating the vessel at will about its longitudinal axis, an index by which is indicated to the operator the disposition of the twyers with reference to the surface of the contained metal-bath, and means for changing the angle of the vessel during rotation.

10. A vessel for the pneumatic treatment of iron and other metals, mounted with its longitudinal axis inclined to a vertical line, and having in its side wall an opening through which the metal may be charged and discharged, and twyers in a portion of the vessel's wall which is above the normal level of the molten metal when the vessel is in charging position, combined with means for rotating the vessel as an entirety about its longitudinal axis.

11. A cylindrical vessel for the pneumatic treatment of iron and other metals, mounted with its longitudinal axis inclined to a vertical line and having in its side wall an opening through which metal may be charged and discharged, and twyers combined with means for rotating the vessel about its longitudinal axis and means for changing the angle thereof.

In testimony whereof I have signed my name to this specification in the presence of two subscribing witnesses.

JACQUES MORAT.

Witnesses:
 CECIL MYERS,
 EDGAR L. WYBERT.